United States Patent
Bruckner

(10) Patent No.: US 10,079,763 B2
(45) Date of Patent: Sep. 18, 2018

(54) METHOD FOR DATA COMMUNICATION WITH REDUCED OVERHEAD IN A REAL-TIME CAPABLE ETHERNET DATA NETWORK

(71) Applicant: B&R INDUSTRIAL AUTOMATION GMBH, Eggelsberg (AT)

(72) Inventor: Dietmar Bruckner, Anthering (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 43 days.

(21) Appl. No.: 15/281,781

(22) Filed: Sep. 30, 2016

(65) Prior Publication Data

US 2017/0099222 A1 Apr. 6, 2017

(30) Foreign Application Priority Data

Oct. 1, 2015 (AT) .............................. A 50834/2015

(51) Int. Cl.
*H04W 4/00* (2018.01)
*H04L 12/801* (2013.01)
(Continued)

(52) U.S. Cl.
CPC .......... *H04L 47/12* (2013.01); *H04L 61/6022* (2013.01); *H04L 69/16* (2013.01); *H04L 69/22* (2013.01); *H04L 69/324* (2013.01)

(58) Field of Classification Search
None
See application file for complete search history.

(56) References Cited

U.S. PATENT DOCUMENTS

| | | | |
|---|---|---|---|
| 5,214,647 A | 5/1993 | Komatsu | |
| 2007/0230462 A1* | 10/2007 | Nakayama | H04L 12/403 370/389 |

(Continued)

FOREIGN PATENT DOCUMENTS

| | | |
|---|---|---|
| DE | 10 2013 225 882 | 6/2015 |
| EP | 0 963 078 | 12/1999 |
| EP | 2 410 697 | 1/2012 |

OTHER PUBLICATIONS

Schumacher et al., "A New Approach for Increasing the Performance of the Industrial Ethernet System PROFINET," Factory Communication Systems, 2008. WFCS 2008. IEEE int'l Workshop on, Dresden 2008, pp. 159-167.

(Continued)

*Primary Examiner* — Phirin Sam
(74) *Attorney, Agent, or Firm* — Greenblum & Bernstein, P.L.C.

(57) ABSTRACT

In order for a real-time capable Ethernet data network protocol to shorten the cycle time of the transmission cycles in a real-time capable Ethernet data network it is provided that a plurality of slaves (S1, S2, S3, S4) is combined into a sum frame group (SG) and one of these slaves (S1, S4) serves as initiator slave of the sum frame group (SG) and transmits a sum frame data packet (DPSR) to the other slaves (S1, S2, S3, S4) of the sum frame group (SG), so that these other slaves (S1, S2, S3, S4) of the sum frame group (SG) receive the sum frame data packet (DPSR) in sequence, each of these slaves (S1, S2, S3, S4) writes its data (D1, D2, D3, D4) into the sum frame data packet (DPSR) and the last slave (S4, S1) of the sequence transmits the sum frame data packet (DPSR) to the master (M).

8 Claims, 4 Drawing Sheets

Figure 1:
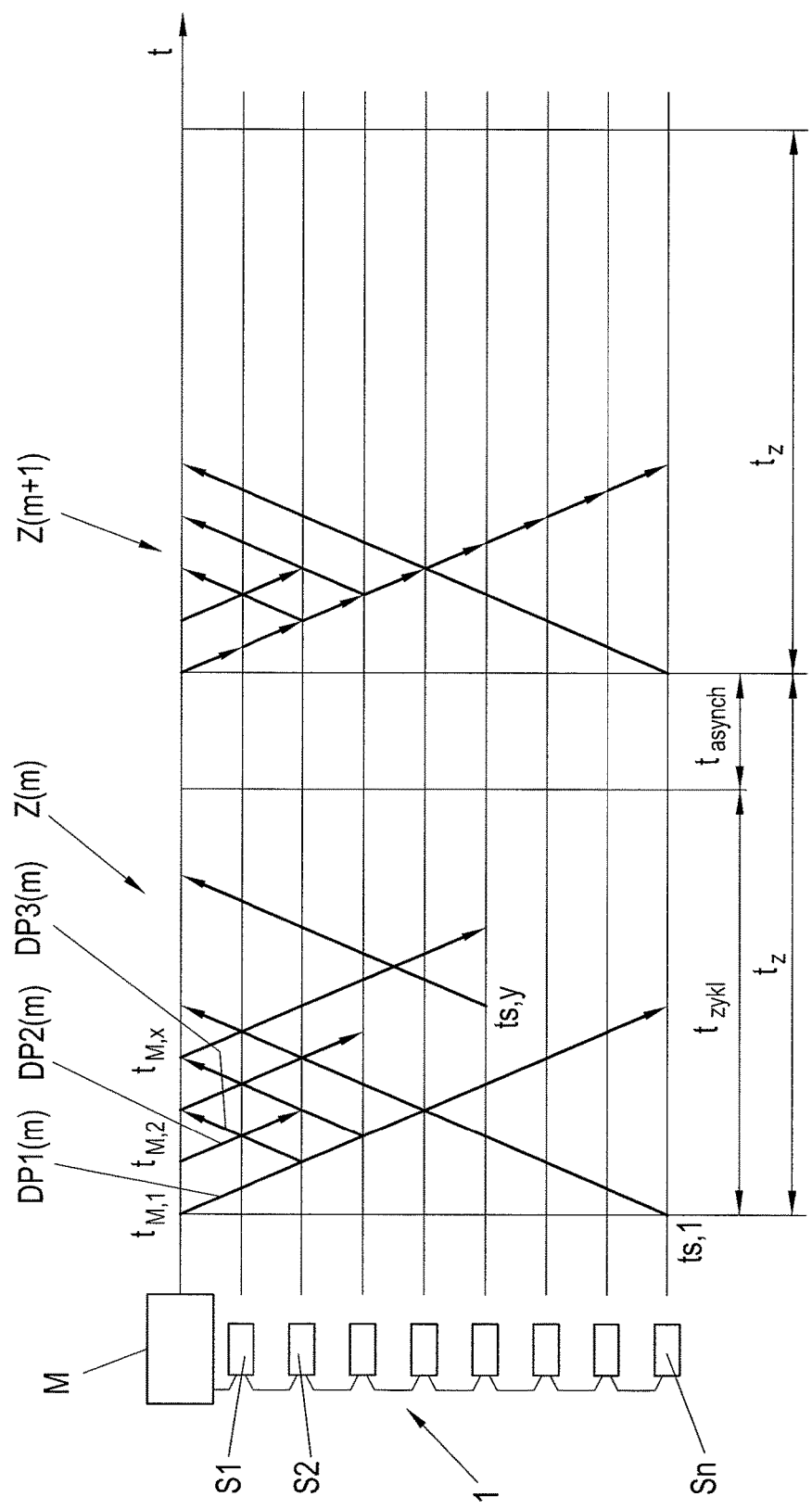

(51) Int. Cl.
    *H04L 29/06*   (2006.01)
    *H04L 29/12*   (2006.01)
    *H04L 29/08*   (2006.01)

(56) References Cited

U.S. PATENT DOCUMENTS

| | | | | |
|---|---|---|---|---|
| 2008/0151801 A1* | 6/2008 | Mizuta | ................ | H04W 52/343 |
| | | | | 370/311 |
| 2009/0157929 A1* | 6/2009 | Pigott | ................ | G06F 13/4291 |
| | | | | 710/110 |
| 2009/0222606 A1* | 9/2009 | Janssen | ................ | H04L 12/437 |
| | | | | 710/110 |
| 2010/0325325 A1* | 12/2010 | Fernald | ................ | G06F 1/26 |
| | | | | 710/106 |
| 2011/0152889 A1 | 6/2011 | Barrenscheen | | |
| 2012/0140861 A1 | 7/2012 | Menon et al. | | |
| 2013/0128895 A1 | 5/2013 | Kirrmann et al. | | |
| 2015/0169022 A1 | 6/2015 | Gauger | | |
| 2016/0034417 A1* | 2/2016 | Chavez | ................ | G06F 13/4282 |
| | | | | 710/110 |

OTHER PUBLICATIONS

Austria Search Report/Office Action conducted in counterpart Austria Appln. No. A 50834/2015 dated (Sep. 20, 2016) (w/ partial machine translation).

Europe Search Report/Office Action conducted in counterpart Europe Appln. No. 16191502.0 dated (Nov. 18, 2016) (w/ partial machine translation).

* cited by examiner

METHOD FOR DATA COMMUNICATION WITH REDUCED OVERHEAD IN A REAL-TIME CAPABLE ETHERNET DATA NETWORK

This application claims priority under 35 U.S.C. § 119(a) of Austrian Application No. A50834/2015 filed Oct. 1, 2015, the disclosure of which is expressly incorporated by reference herein in its entirety The present invention relates to a method for data communication in a real-time capable Ethernet data network, in which a master is connected by means of the Ethernet data network to a plurality of slaves and data in the form of data packets are transmitted between the master and the slaves.

In a data network for data communication, a network protocol is implemented, with which data is transferred in data packets in the data network between the network nodes which are connected to the data network. Probably the best known and most widespread network protocol is the Ethernet protocol. Hereto, Ethernet defines data packets (also called data frame or Ethernet frame), in which data of a higher-level communication protocol can be transferred encapsulated in an Ethernet data packet. In doing so, data of the communication protocol can be transferred in an Ethernet data packet with a data length between 46 and 1500 bytes. Addressing in the Ethernet protocol is effected by means of MAC (Media Access Control) addresses of the network nodes which are clearly allocated for every network device. As seen from the perspective of the known OSI model, Ethernet is exclusively implemented on layers 1 and 2. In the higher layers, different communication protocols can be implemented. Hereby, a multiplicity of communication protocols has been established, for example IP in layer 3 or TCP and UDP in layer 4 to name but a few of the most widespread communication protocols.

With regard to hardware, today's Ethernet systems are so-called switched data networks, in which individual network nodes do not have to be connected with one another and do not have to be able to communicate with one another, but can instead be connected by means of coupling elements, so called switches or network hubs. For such purpose, a coupling element has a number of network ports for the option of connecting a network participant (either a network node or a different coupling element). Such a coupling element forwards an Ethernet data packet either to all ports (hub) or to (one) specific port(s) (switch). Thus, so-called point-to-point connections are created in a switched data network, in which Ethernet data packets are forwarded from one network node to a different network node by means of a number of coupling elements.

Network nodes which are used in the industrial automation often have a built-in internal 3-port switch, wherein two ports are accessible from outside and the third port serves the internal interconnection. As a result, without additional external coupling elements, line topologies can be realized, in which a network node is connected to the next adjacent network node in the form of a line, which is advantageous in an industrial environment for reducing the cabling effort. However, it is self-evident that external network switches or external network hubs can also be used for the setup of the network topology. Basically, any network topology is possible, i.e. particularly a star topology, a line topology, a tree topology, a ring topology, etc. as well as any combination thereof. As a rule, a ring topology, as is known in general, requires specific precautions in order to prevent the uncontrolled circulation of multiple-address data packets.

In order to be able to also use Ethernet for industrial automation, real-time capable Ethernet protocols have already been developed because the standard Ethernet protocol is known to not be real-time capable. Examples of known real-time capable Ethernet network protocols are Modbus/TCP, Ethernet/IP, ProfiNET IRT, EtherCAT, or Ethernet POWERLINK, to name but a few. In this context, often also the term industrial Ethernet is used. These real-time capable Ethernet protocols are supposed to ensure data communication that is sufficiently fast and deterministic for the corresponding application. They are thus supposed to ensure that a real-time relevant data packet is transferred via the network within a predetermined interval from a transmitting network node to a receiving network node. In an industrial automation environment, real-time capability means, e.g. that a fixed interval must be observed between the acquisition of a measured value, transfer of the measured value to a control unit, calculation of an actuating value in the control unit based on the measured value, and transfer of the actuating value to an actuator for executing an operation. With reference to the real-time capable Ethernet data network for transferring these data via the real-time capable Ethernet data network a predetermined interval of the data transmission must be ensured.

In an industrial automation environment, there is generally as least one master network node (hereinafter also called master for short) which communicates with at least one associated, but usually a plurality of associated slave network nodes (hereinafter also called slaves for short). For realizing a real-time capable Ethernet data network, the known real-time capable Ethernet network protocols have defined a transmission cycle having a predefined cycle time, within which the master can communicate with each slave. This normally comprises cyclically the possibility of a data packet from the master to every slave and conversely also at least one data packet from a slave, normally at least one data packet from each slave to the associated master. The attainable and beforehand ascertainable minimal cycle time results from the sum of the maximum run times of the data packets. The run times are hardware-dependent and result from bit transmission times (length, payload) of the data packets, network infrastructure (e.g. delays due to coupling elements), and the network topology. The above-mentioned limits regarding the size of the Ethernet data packets must also be taken into account.

This cyclical (isochronous) data traffic, which constitutes the basis of the real-time capability in the real-time capable Ethernet network protocol, is usually expanded in each transmission cycle by asynchronous (non-cyclical) data packets. Such asynchronous data packets are used by the data communication which is not subject to the real-time requirements, for example for configuration of the slaves, for visualization purposes or for status enquiries. Bandwidth is reserved for such asynchronous data packets, i.e. a specific, defined time is available in each transmission cycle for asynchronous data traffic. The known real-time capable Ethernet protocols differ in the specific implementation of the cyclical and asynchronous data traffic.

Real-time capable Ethernet data network are increasingly large, in the sense that ever more network nodes are incorporated into the data network. The bandwidth available in the data network for the data communication must therefore be well planned, in order to keep the achievable transmission times low for real-time applications.

However, the bandwidth is occupied by many very short data packets. The smallest Ethernet data packet contains 46 bytes of data. If the usage data to be transmitted are shorter, the data packets must be filled, generally with zeros (the so-called frame padding with padding data). However, in a real-time capable Ethernet data network the slaves (e.g. sensors, input/output devices, transmitters, etc.) often transmit only a small amount of data (in the sense of a small data length) to the master (e.g. a control unit), so that a substantial amount of bandwidth on the data network is wasted by these short data packets.

In order to be able to better utilize the available bandwidth so-called sum frames have already been used in which data for or of a plurality of network nodes are contained. In this way savings can be made on overhead, and possibly padding data, of many smaller data packets, whereby the bandwidth can be utilized better and the cycle time can be shortened. EtherCAT, for example, uses a sum frame method, in which the master sends a data packet with data for all slaves to the first slave. This latter reads its data out of the data packet (output data) and overwrites these data with data which the slave wishes to transmit to the master (input data). This modified data packet is then transmitted to the second slave, etc., until in the reverse sequence the data packet from the last slave is again transmitted to the master. The disadvantage of this is that the reserved data in the sum frame per slave must always be as great as the maximum of input and output data of each slave, which reduces the available bandwidth. Furthermore, EtherCAT needs dedicated components (ASIC) in the network node, since this method does not work with standard Ethernet hardware. In another known implementation of the sum frame method the data packet is curtailed in the direction from the master to the slave, and each slave takes its data from the data packet and lengthens it in the reverse direction, as each slave adds its data to the data packet on the master. A disadvantage of such a sum frame method is that the data packet has a different length at each location in the data network and so the data network is difficult to diagnose. Apart from this, here too dedicated components must also be employed in the network nodes for implementation. Such a sum frame method is supported by ProfiNet IRT (dynamic frame packing). POWERLINK sends a data packet from the master as sum frame to all slaves and the master receives a separate Ethernet data packet back from each slave. This method can be implemented with standard Ethernet hardware, because the sum frame is generated once in the master and thereafter is not changed by any other network nodes. However, the known methods are all based on the master initiating the data communication.

With this method an improvement could already be achieved in the utilization of the available bandwidth on the real-time capable Ethernet data network. In other words, more data can be transmitted per unit of time, or the cycle times of the transmission cycles could be shortened.

Therefore, it is an object of the present invention to provide a method by which the cycle time of the transmission cycles can be shortened in a real-time capable Ethernet data network.

This object is achieved according to the invention in that a plurality of slaves is combined into a sum frame group and one of these slave serves as initiator slave of the sum frame group and transmits a sum frame data packet to the other slaves of the sum frame group, whereby these other slaves of the sum frame group receive the sum frame data packet in sequence, each of these slaves writes its data into the sum frame data packet and the last slave of the sequence transmits the sum frame data packet to the master. Savings can be made on overhead data due to the sum frame data packet, which contains data of a plurality of slaves, so that there are less data to be transmitted via the data network and thus also the required cycle time can be reduced.

If a first multiple address by means of which all slaves of the sum frame group can be addressed is assigned for the sum frame group, and the initiator slave of the sum frame group transmits a sum frame data packet to the first multiple address, the sum frame method according to the invention can be implemented in a simple manner.

In a preferred embodiment the first multiple address contains the master. Thus the configuration costs can be reduced. This embodiment is particularly advantageous if the initiator slave transmits the sum frame data packet in the direction of the master, and therefore if the initiator slave is further away from the master than the other slaves of the sum frame group.

It is especially advantageous if the last slave of the sequence transits the sum frame data packet to at least one further slave of the sum frame group, preferably to all other slaves of the sum frame group. In this way direct cross traffic can be implemented between two slaves, so that the two slaves can exchange data with one another without the assistance of the master, which would otherwise be necessary.

In a preferred embodiment a second multiple address is assigned for the sum frame group, wherein the second multiple address comprises the master and at least one slave of the sum frame group and the last slave of the sequence transmits the sum frame data packet to the second multiple address. This embodiment is particularly advantageous if the initiator slave is the slave of the sum frame group which is nearest to the master. For this purpose, it may advantageously be provided that the second multiple address contains, in addition to the master, all slaves of the sum frame group or all slaves of the sum frame group which exchange data with one another by means of direct cross traffic. In this way direct cross traffic can also be implemented in a simple manner between two slaves.

If each slave of the sum frame group adds slave redundancy data to its data, the master has the possibility of examining the data of the slaves of the sum frame group in each case for possible errors.

Figure 2:
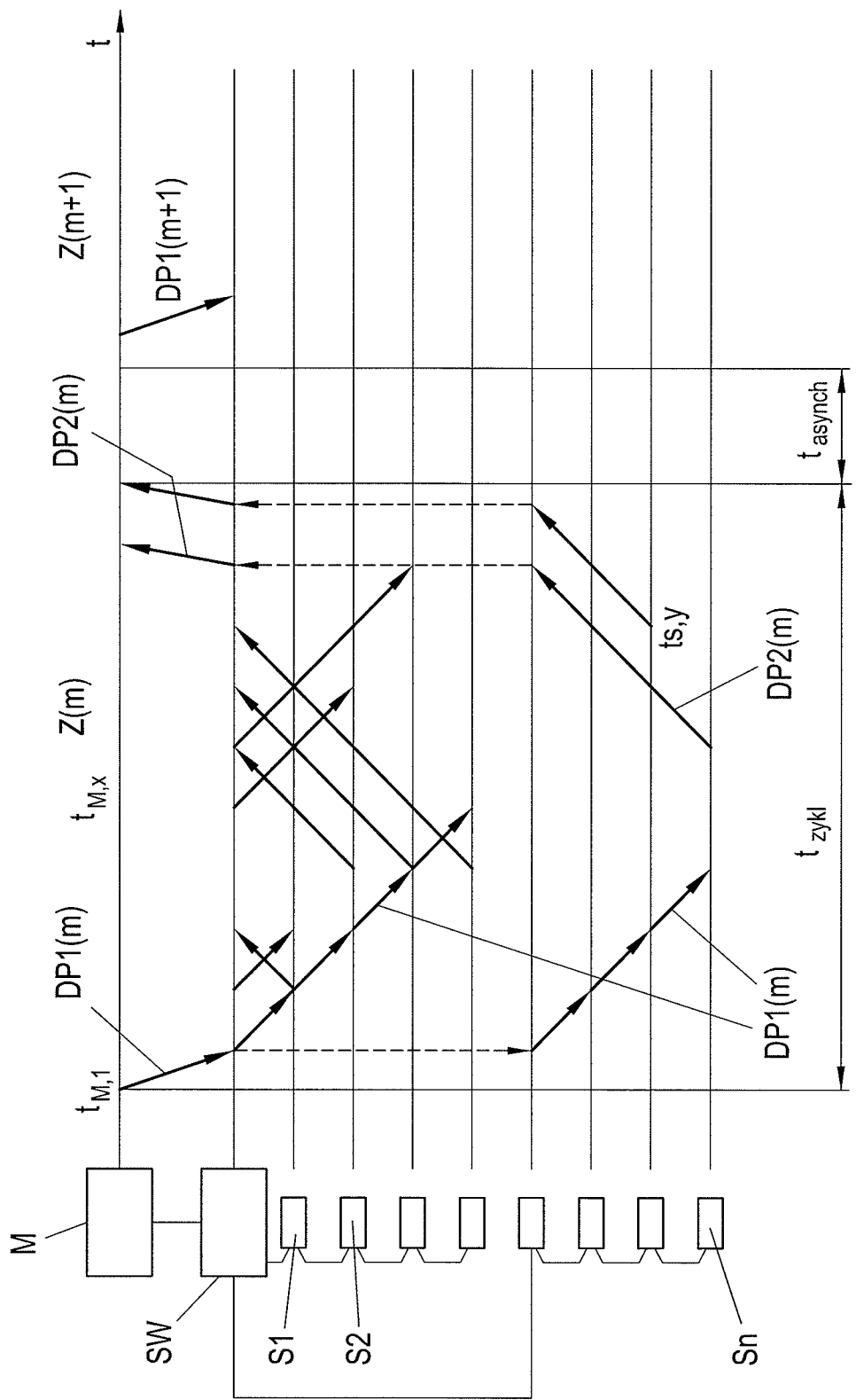
Figure 3:
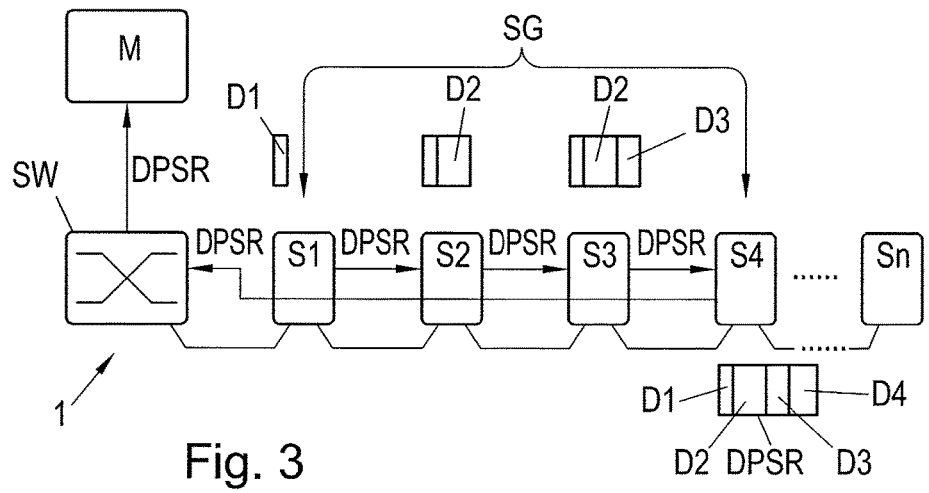
Figure 4:
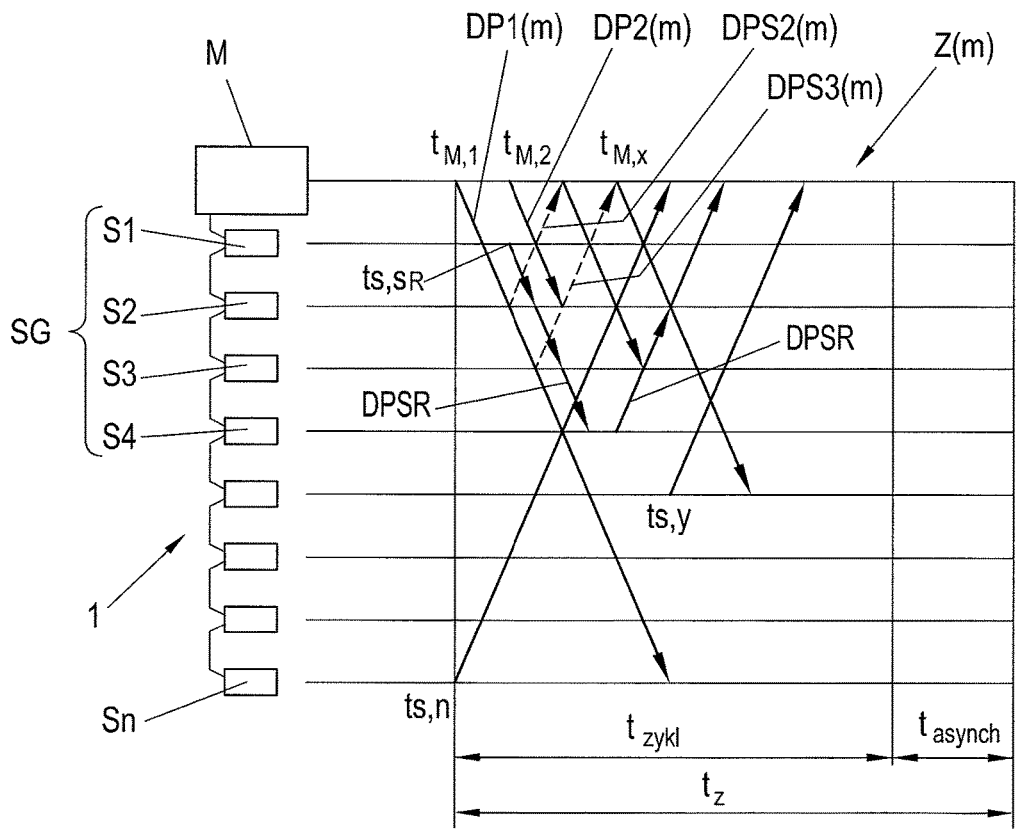
Figure 5:
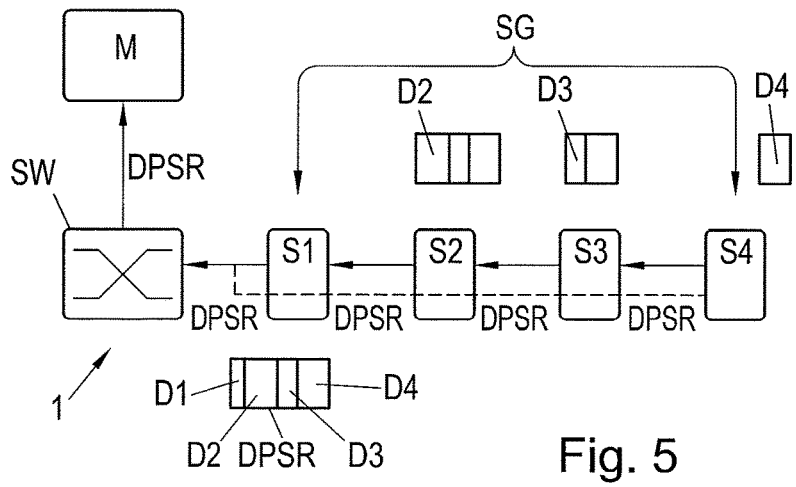
Figure 6:
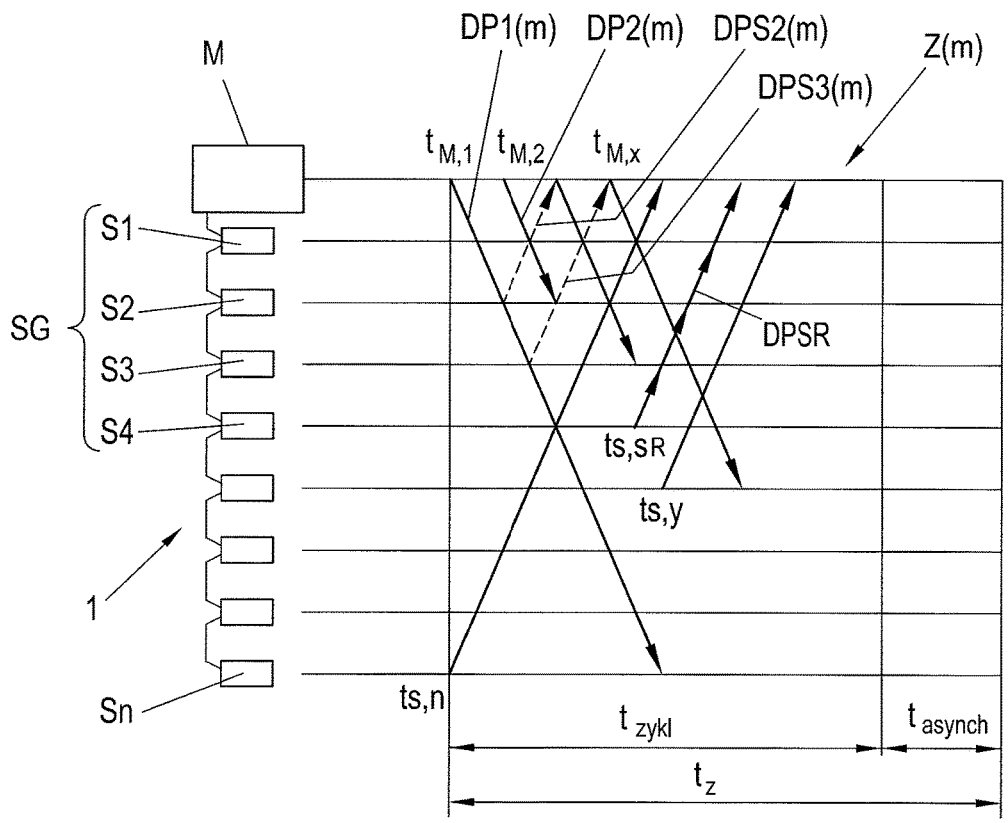

The present invention is explained in greater detail below with reference to FIGS. 1 to 6, which show by way of example, schematically and without limitation, advantageous embodiments of the invention. In the drawings:

FIGS. 1 and 2 show the communication on a real-time capable Ethernet data network, FIGS. 3 and 4 show a first implementation of the sum frame method according to the invention, and FIGS. 5 and 6 show a further implementation of the sum frame method according to the invention.

A possible real-time capable Ethernet network protocol on which the invention is based is explained with reference to FIG. 1, wherein naturally other real-time capable Ethernet network protocols could also be used. For the description an example of a network topology is used in the form of a linear topology in which network nodes, in this case a master M with a number of series-connected slaves S1 . . . Sn, are connected to form a network. The slaves S1 . . . Sn here are embodied as network devices having an integrated 3-port switch (coupling element) that permits such a linear topology without external coupling elements. The master M is able to communicate in every transmit cycle Z, at prespecified cycle time $t_Z$, with every slave S1 . . . Sn, in that Ethernet data packets DP (hereinafter simply called data packets DP) are sent on the Ethernet data network 1. A sent data packet DP is indicated as an arrow in FIG. 1, wherein the arrow tip indicates the transmit direction (that is, from master M to a slave S or vice versa). Each horizontal line is assigned to a network node (master M or Slave S1 . . . Sn) and represents a timeline. The latency caused by the network when transmitting the data packets DP via the Ethernet data network 1 is indicated by the inclined arrows, wherein the processing period for the data packs DP into the coupling elements and the latency from the finite propagation speed in the medium (copper cable, fiber optics), combined and simplified, are assumed as constant.

A transmission cycle Z(m) is precisely temporally divided in that the times $t_{M,1}, t_{M,2}, \ldots, t_{M,x}, t_{S,1}, \ldots, t_{S,y}$ at which each network node, the master M or the slaves S1 . . . Sn may send data packets DP are predefined. In this way it is possible to prevent data collisions on the data network 1 by scheduling the times. However, since Ethernet allows for a full-duplex data communication, it is possible that in a network section, data packets DP are transmitted simultaneously in both directions. This is how each of the subscribing network nodes (master M, slaves S) know the time within a transmit cycle Z at which they may send data packets DP, and when they are to receive some.

These times $t_{M,1}, t_{M,2}, \ldots, t_{M,x}, t_{S,1} \ldots, t_{S,y}$ within the transmission cycle Z may be planned very precisely in advance if it is known how much data (bytes) are transmitted in each data packet DP. The larger the data packet DP to be expected, the further apart the times $t_{M,1}, t_{M,2}, \ldots, t_{M,x}, t_{S,1}, \ldots, t_{S,y}$. If the data size is not known in advance, a maximum data size may be assumed, e.g. the maximum frame size for an Ethernet frame. Between two data packets DP also a predetermined pause must be maintained at the data network 1.

The number of network nodes, masters (M) and slaves (S1 . . . Sn), and the size of the sent data are therefore co-determinant for the attainable cycle time $t_Z$.

In FIG. 1, at the time $t_{M,1}$ the master M transmits a data packet DP1(m) to the last slave Sn in the transmission cycle Z(m). However, this data packet DP1(m) could also be a summation frame that contains data for all slaves S1 . . . Sn (indicated in the transmission cycle Z(m+1)) and from which the slaves S1 . . . Sn read their data. At an established time $t_{M,2}$ thereafter, the master M transmits the next data packet DP2(m), in this case, e.g. to the slave S2. The slave S2 may also transmit a data packet DP3(m) to the master M at the same time. This principle is also maintained by the rest of the network nodes, wherein it is not necessary for every slave S1 . . . Sn to receive or transmit a data packet DP. However, the communication is advantageously planned by the prespecification of the times $t_{M,1}, t_{M,2}, \ldots t_{M,x}, t_{S,1}, \ldots, t_{S,y}$ such that the data packets DP from the slaves S1 . . . Sn arrive at the master M successively and without a temporal gap (apart a pause that is to be maintained). This communication sequence then repeats itself in the subsequent transmission cycles Z(m+i), wherein the same network nodes do not always have to transmit or receive data packets DP in the same transmission cycle Z, as indicated in FIG. 1.

This planned data communication occurs cyclically and in each transmission cycle Z a temporal segment $t_{zykl}$ is provided for this isochronous data traffic. However, in each transmission cycle Z also a segment $t_{asynch}$ is reserved for asynchronous data traffic in which Ethernet data communication takes place which does not have to satisfy hard realtime requirements.

If the cyclical communication differs from transmission cycle to transmission cycle (as is indicated in FIG. 1 between Z(m) and Z(m+1), as an example), then there is at least a maximum periodic time (transmission cycle), within which the isochronous transmit patterns (not necessarily the data contents) repeat precisely, i.e. the cyclic data packets in Z(m) are identical to those in Z(m+a). In each individual transmission cycle Z, however, the ratio between $t_{zykl}$ and $t_{asynch}$ may change, depending on the number of planned cyclic data packets.

This communication principle of course also applies in other network topologies, as is described in FIG. 2 with the example of a star topology. In this case, a star topology is constructed by means of an external network switch SW, wherein a line topology as described in FIG. 1 is realized in each branch. The master M is also connected to the network switch SW. In the example shown, a data packet DP1(m) is transmitted, in the form a summation frame, to all slaves S1 . . . Sn at time $t_M$ at the beginning of each transmission cycle Z. This data packet DP1(m) is forwarded by the network switch SW to the two branches and there is transmitted to all slaves S1 . . . Sn. The other data packets DP are then retransmitted at times $t_{M,x}, t_{S,y}$ provided therefor within the transmission cycle Z(m). However, it must be kept in mind that the data packets DP that are returned to the master M by the slaves S1 . . . Sn should preferably be planned such that no data jam can occur in the master M and in the network switch SW therebetween. The time for the data packet DP2(m) from the slave Sn to the master M should be planned, e.g. such that this data packet DP2(m) does not collide with other data packets from the other branch of the star topology, as shown in FIG. 2. For reasons of clarity, data packets DP moving back and forth between master M and network switch SW are depicted only partly in FIG. 2.

The method according to the invention for data communication in a real-time capable Ethernet data network will now be explained with reference to FIG. 3. In this case the real-time capable Ethernet data network 1 consists of a master network node M, a network switch SW and a plurality of slave network nodes S1, . . . , Sn. A number of slaves, in the illustrated exemplary embodiment the slaves S1, S2, S3, S4, are combined into a sum frame group SG.

A sum frame data packet DPSR is initiated by an initiator slave, in this case the slave S1, and transmitted to all other slaves S2, S3, S4 of the sum frame group SG. These slaves S2, S3, S4 must therefore be configured so that when a sum frame data packet DPSR arrives it forwards it to a subsequent slave of the sum frame group SG. That can take place in different ways.

Since an Ethernet data packet is known to contain the destination address of the data packet, the slaves S1, S2, S3, S4 can be configured so that a slave S1, S2, S3, S4 changes the destination address contained in the sum frame data packet DPSR before the sum frame data packet DPSR is forwarded. For this purpose, the slaves S1, S2, S3, S4 must recognize a sum frame data packet DPSR and must know the respective next slave S1, S2, S3, S4 of the sum frame group SG (which can be configured in the address tables of the slaves S1, S2, S3, S4).

Likewise it is possible that the slaves S1, S2, S3, S4 of the sum frame group SG are logically connected to one another by means of a first multiple address. A multiple address is a network address by which a plurality of network nodes is addressed simultaneously. If a data packet is transmitted to such a multiple address, each network node associated with this multiple address considers the data packet as a data packet intended for this network node. Each slave S1, S2, S3, S4 of the sum frame group SG must be configured appropriately in its address table. Thus the information that the slaves S1, S2, S3, S4 belong to the sum frame group SG must also be stored in the slaves S1, S2, S3, S4. Each slave S1, S2, S3, S4 of the sum frame group SG transmits the sum frame data packet DPSR to this first multiple address.

In this case the sum frame data packet DPSR is transmitted in sequence from one slave of the sum frame group SG to the next. Each of the slaves S1, S2, S3, S4 of the sum frame group SG inserts its data D1, D2, D3, D4 into the sum frame data packet DPSR.

As described, the slaves S1, S2, S3, S4 of the sum frame group SG are configured appropriately, preferably in the respective address tables. Therefore, each slave S1, S2, S3, S4 of the sum frame group SG knows the other slave of the sum frame group SG to which the sum frame data packet DPSR is to be forwarded.

In this case it may be provided that the initiator slave S1 transmits a sum frame data packet DPSR of the required value size and each slave inserts its data D1, D2, D3, D4 at the point provided in the sum frame data packet DPSR. Alternatively, each of the slaves S1, S2, S3, S4 can also attach its data D1, D2, D3, D4 in the sum frame data packet DPSR, so that the sum frame data packet DPSR becomes ever longer. The last slave S4 of the sequence of slaves S1, S2, S3, S4 in the sum frame group SG then transmits the sum frame data packet DPSR to the master M. It may also be provided that the last slave S4 of the sequence also transmits the sum frame data packet DPSR to other slaves of the sum frame group SG, preferably to all slaves of the sum frame group SG which require direct cross traffic (see below).

The transmission of the sum frame data packet DPSR to the master M can be implemented in different ways, in a similar manner to that described above. The last slave S4 of the sequence can directly address the master M. However, this slave S4 can also address another slave S1, S2, S3 of the sum frame group SG which can likewise receive the sum frame data packet DPSR and can then forward the sum frame data packet DPSR in turn to other slaves of the sum frame group SG or to the master M. However, it is also possible to configure a second multiple address, which comprises the master M and at least one slave S1, S2, S3, S4 of the sum frame group SG, for the transmission of the sum frame data packet DPSR to the master M. If the sum frame data packet DPSR is passed via at least one slave S1, S2, S3, S4 of the sum frame group SG on the way to the master M, then direct cross traffic between slaves S1, S2, S3, S4 of the sum frame group SG can be implemented in a simple manner.

It may be provided that only one single multiple address is configured, which also contains the master M, and both the initiator slave and also the last slave of the sum frame group SG transmits to this multiple address.

The known overhead data of an Ethernet data packet such as the sum frame data packet DPSR, and necessary padding data, are not shown in FIG. 3 for the sake of simplicity. However, the overhead data, and possibly data due to frame padding, of an Ethernet data packet are much less than the overhead data of many individual data packets from the slaves S1, S2, S3, S4 to the master M. Since now the overhead data for the sum frame data packet DPSR only have to be transmitted once, the cycle time $t_z$ of the transmission cycles can also be reduced, since in total less data are transmitted in the direction of the master M.

In the exemplary embodiment according to FIG. 3 the initiator slave S1 is arranged on the data network 1 nearer to the master M than the last slave S4 of the slaves S1, S2, S3, S4 of the sum frame group SG. Thus the sum frame data packet DPSR is initially transmitted in the direction away from the master M. The last slave S4 then transmits the sum frame data packet DPSR in the direction back to the master M, so that the sum frame data packet DPSR again passes through all the slaves S1, S2, S3, S4 participating in the sum frame group SG. This has the advantage that in this way direct cross traffic between two slaves S1, S2, S3, S4 of the sum frame group can be implemented simultaneously. In other words, in this way two (or even more) slaves S1, S2, S3, S4 can exchange data directly with one another.

If only one multiple address is used for both transmission directions of the sum frame data packet DPSR, then at the time of the first transmission the initiator slave S1 in FIG. 3, which is arranged closer to the master than other slaves S2, S3, S4 of the sum frame group SG, would transmit the sum frame data packet DPSR not only to the other slaves S2, S3, S4 of the sum frame group SG but also directly to the master M. The master M can now be configured so that it ignores such a sum frame data packet DPSR, which still contains no data of the slaves S2, S3, S4. For this purpose, the master M recognizes with reference to the content of the sum frame data packet DPSR whether or not this is a sum frame data packet DPSR to be ignored. For this purpose, the master M can examine the content of the data of the slaves S2, S3, S4 (which can be filled by the slave S1 with a specific pattern) or a flag which indicates this could also be contained in the sum frame data packet DPSR. Alternatively, the initiator slave S1 can transmit to a first multiple address which does not contain the master M. The last slave S4 of the sequence can then transmit to a second multiple address which also contains the master M. Before the transmission this second multiple address is then inserted into the sum frame data packet DPSR by the last slave S4. In this way the completed sum frame data packet DPSR is transmitted from the last slave S4 in the direction towards the master M. Thus in the slaves S1, S2, S3, S4 of the sum frame group SG, at least those with direct cross traffic, both the first multiple address and also the second multiple address must be configured. If no cross traffic is provided, the last slave S4 of the series can also directly address the master M in the sum frame data packet DPSR.

FIG. 4 again shows the data packet traffic in this exemplary embodiment (without the network switch SW for the sake of simplicity). As already described, the data traffic on the real-time capable Ethernet data network 1 is planned precisely in terms of time. Thus a sum frame data packet DPSR of a sum frame group must likewise be planned precisely in terms of time and implemented in addition to the conventional data traffic. At the time $t_{S,SR}$ of a transmission cycle Z(m) it is provided that the initiator slave S1 transmits a sum frame data packet DPSR to the configured multiple address. This sum frame data packet DPSR is preferably transmitted as early as possible in the transmission cycle $t_Z$, as shown in FIG. 4, in order to save bandwidth. All other slaves S1, S2, S3, S4 of the sum frame group SG likewise transmit the sum frame data packet DPSR at defined times.

The last slave S4 of the sequence then transmits the sum frame data packet DPSR to the master M, either directly or, as in the illustrated exemplary embodiment, by means of at least one other slave S2 of the sum frame group SG. Thus direct cross traffic can be implemented between the slaves S2, S4.

The directly data communication of a slave S2, S3 of the sum frame group SG to the master M by means of direct addressing may also be superfluous with the sum frame data packet DPSR. Thus the data packets DPS2 and DPS3 of the slaves S2, S3 could be spared, as indicated by broken lines in FIG. 4.

FIG. 5 shows a further possibility for transmission of a sum frame data packet DPSR according to the invention. Here the initiator slave is the slave S4, that is to say the slave of the slaves S1, S2, S3, S4 of the sum frame group SG furthest away from the master M on the data network 1. At the provided time $t_{S,SR}$ of a transmission cycle Z(m) (FIG. 6) the initiator slave S4 again transmits a sum frame data packet DPSR (again with the required length for all data D1, . . . , D4, or alternatively only with its data D4) to the configured multiple address. In this case the multiple address comprises the master M and all other slaves S1, S2, S3 of the sum frame group SG. Thus the sum frame data packet DPSR is again passed through all slave S1, S2, S3, S4 of the sum frame group SG and is ultimately transmitted from the last slave S1 of the sum frame group to the master M. Each slave S1, S2, S3, S4 inserts its data into the sum frame data packet DPSR. In this case it is sufficient to configure a first multiple address which contains the master M and all slaves S1, S2, S3, S4 of the sum frame group SG. However, in this embodiment no direct cross traffic is possible between two slaves of the sum frame group SG.

Since the sum frame data packet DPSR is passed from slave to slave through the sum frame group SG and each slave adds its data, it is advantageous if each slave of the sum frame group SG secures its data by discrete slave redundancy data (for example a cyclic redundancy code CRC). In this case these slave redundancy data are overhead data in addition to the Ethernet redundancy data of the Ethernet data packet in the Ethernet. Without these slave redundancy data it could happen that incorrect data are marked as error-free by overwriting the Ethernet redundancy data in a slave for the following slaves and the master M. Since each slave recalculates the Ethernet redundancy data and inserts them into the Ethernet data packet, such errors could not be recognized with reference only to the Ethernet redundancy data. The master M can then examine the data of the slaves S1, S2, S3, S4 for errors with reference to the slave redundancy data. In addition, it could also be provided that a slave which recognizes an error in the data also sets a corresponding flag in the sum frame data packet DPSR. The master M, or a slave of the sum frame group SG participating in direct cross traffic between two slaves, can then decide with the set flag whether to discard the entire sum frame data packet DPSR as incorrect, or whether to examine the individual slave redundancy data.

It should be noted that the slaves S1, S2, S3, S4, S5 of a sum frame group SG on the data network 1 do not have to be arranged directly behind one another, as in the illustrated exemplary embodiments. Likewise, it is not necessary for the sum frame data packet DPSR to be transmitted within the sum frame group SG according to the arrangement in the real-time capable Ethernet data network, such as in the illustrated exemplary embodiments, although this is definitely preferred. In principle the sum frame data packet DPSR can be transmitted in any sequence of the slaves S1, S2, S3, S4 of the sum frame group SG. Naturally, however, it is desirable that the sum frame data packet DPSR is en route in the data network 1 as little as possible and over the shortest possible distances.

The invention claimed is:

1. A method for data communication in a real-time capable Ethernet data network, in which a master is connected via an Ethernet data network to a plurality of slaves and data in the form of data packets are transmitted between the master and the slaves, the method comprising:
   combining at least some of the plurality of slaves into a sum frame group, wherein one of the slaves of the sum frame group serves as an initiator slave of the sum frame group;
   transmitting a sum frame data packet from the initiator slave to the other slaves of the sum frame group, so that the other slaves of the sum frame group receive the sum frame data packet in sequence,
   wherein each of the other slaves writes its data into the sum frame data packet and a last of the other slaves in the sequence transmits the sum frame data packet to the master.

2. The method according to claim 1, wherein, for the sum frame group, a multiple address is assigned by which all slaves of the sum frame group are addressed, and the initiator slave transmits the sum frame data packet to a first of the multiple address.

3. The method according to claim 2, wherein the first of the multiple address comprises the master.

4. The method according to claim 1, wherein the last slave in the sequence transmits the sum frame data packet to at least one further slave of the sum frame group.

5. The method according to claim 1, wherein a second of the multiple address is assigned and comprises the master and at least one slave of the sum frame group, and
   wherein the last slave in the sequence transmits the sum frame data packet to the second of the multiple address.

6. The method according to claim 4, wherein the second of the multiple address comprises all slaves of the sum frame group which exchange data with one another by direct cross traffic data.

7. The method according to claim 1, wherein each slave of the sum frame group adds slave redundancy data to its data.

8. The method according to claim 4, wherein the at least one further slave comprises all of the other slaves.

* * * * *